(12) United States Patent
Sakuma

(10) Patent No.: US 10,223,217 B2
(45) Date of Patent: Mar. 5, 2019

(54) INFORMATION PROCESSING DEVICE, METHOD FOR BOOTING INFORMATION PROCESSING DEVICE, AND NON-TRANSITORY RECORDING MEDIUM

(71) Applicant: Kazunori Sakuma, Kanagawa (JP)

(72) Inventor: Kazunori Sakuma, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 154 days.

(21) Appl. No.: 15/359,918

(22) Filed: Nov. 23, 2016

(65) Prior Publication Data

US 2017/0147455 A1 May 25, 2017

(30) Foreign Application Priority Data

Nov. 24, 2015 (JP) .................................. 2015-229010
May 16, 2016 (JP) .................................. 2016-098155

(51) Int. Cl.
G06F 11/00 (2006.01)
G06F 11/20 (2006.01)
G06F 11/14 (2006.01)
G06F 11/16 (2006.01)
G06F 11/32 (2006.01)

(52) U.S. Cl.
CPC ...... *G06F 11/2028* (2013.01); *G06F 11/1417* (2013.01); *G06F 11/1666* (2013.01); *G06F 11/2046* (2013.01); *G06F 11/326* (2013.01); G06F 11/20 (2013.01); G06F 2201/805 (2013.01)

(58) Field of Classification Search
CPC .. G06F 11/1417; G06F 11/20; G06F 11/2028; G06F 11/2046; G06F 11/2284
See application file for complete search history.

(56) References Cited

U.S. PATENT DOCUMENTS

| | | | | |
|---|---|---|---|---|
| 5,793,943 | A * | 8/1998 | Noll ..................... | G06F 11/1417 714/11 |
| 7,434,042 | B2 * | 10/2008 | Oguma ................. | G06F 9/4408 710/1 |
| 2005/0273588 | A1 * | 12/2005 | Ong .................... | G06F 11/1417 713/2 |
| 2007/0033387 | A1 * | 2/2007 | Arnez ................. | G06F 11/1417 713/1 |

(Continued)

FOREIGN PATENT DOCUMENTS

| | | |
|---|---|---|
| JP | 2002-229742 | 8/2002 |
| JP | 2002-259130 | 9/2002 |
| JP | 2012-194840 | 10/2012 |

*Primary Examiner* — Michael Maskulinski
(74) *Attorney, Agent, or Firm* — Oblon, McClelland, Maier & Neustadt, L.L.P.

(57) ABSTRACT

An information processing device includes at least a first storage device and a second storage device each to store a boot program, a first processor to read the boot program from the first storage device to boot the information processing device from the first storage device, and a second processor connected to each of the first storage device and the second storage device and the first processor. The second processor detects a completion or a failure of the boot from the first storage device, and when detecting the failure of the boot, switches a storage device to be used for booting from the first storage device to the second storage device to control the first processor to read the boot program from the second storage device.

9 Claims, 8 Drawing Sheets

(56) References Cited

U.S. PATENT DOCUMENTS

| | | |
|---|---|---|
| 2012/0236345 A1 | 9/2012 | Machida |
| 2015/0331754 A1* | 11/2015 | Grobelny ................ G06F 9/441 |
| | | 714/23 |
| 2016/0055113 A1* | 2/2016 | Hodge .................. G06F 21/575 |
| | | 710/308 |

* cited by examiner

INFORMATION PROCESSING DEVICE, METHOD FOR BOOTING INFORMATION PROCESSING DEVICE, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application Nos. 2015-229010, filed on Nov. 24, 2015 and 2016-098155, filed on May 16, 2016, in the Japan Patent Office, the entire disclosures of which are hereby incorporated by reference herein.

BACKGROUND

Technical Field

Embodiments of the present disclosure relate to an information processing device, a method for booting the information processing device, and a non-transitory recording medium.

Related Art

An information processing system, such as a computer system boots an operating system from a boot device in response to a start signal.

Figure 10A:
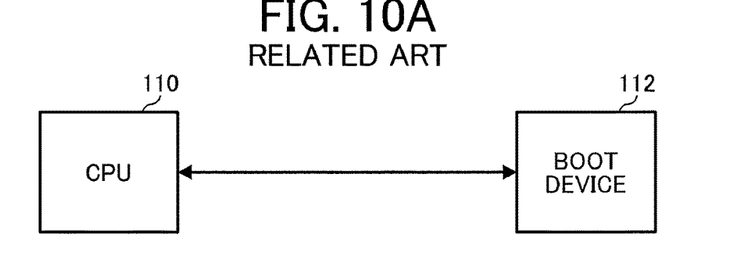
FIGS. 10A and 10B are block diagrams each illustrating a basic configuration of a computer system for booting an operating system from a boot device according to the related art.
Figure 10B:
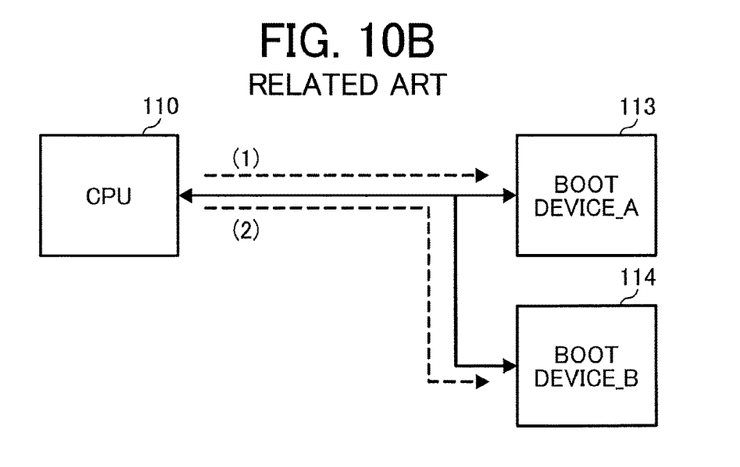

FIGS. 10A and 10B are block diagrams each illustrating a basic configuration of a computer system for booting an operating system from a boot device according to a related art. FIG. 10A illustrates an exemplary basic configuration that includes a single boot device. FIG. 10B illustrates an exemplary basic configuration that includes two boot devices.

With the configuration of FIG. 10A, a central processing unit (CPU) 110 and the single boot device that is a boot device 112 boot the operating system. In booting the operating system, the CPU 110 reads a basic input/output system (BIOS) program (boot program) from the boot device 112. In such a system, the CPU 110 cannot boot from the operating system if the boot device 112 fails.

With the configuration of FIG. 10B, the CPU 110 and the two boot devices that are a boot device_A 113 and a boot device_B 114 boot the operating system. When booting the operating system, the CPU 110 and the boot device_A 113 are connected to each other, as indicated by a dashed line (1) in FIG. 10A, but the CPU 110 and the boot device_B 114 are not connected. When failing to boot the operating system from the boot device_A 113, the CPU 110 is caused to connect, not to the boot device_A 113, but to the boot device_B 114, as indicated by another dashed line (2) in FIG. 10B, for example, according to a user instruction.

In view of the above, JP-2002-259130-A1 discloses a technique for two disc devices (boot devices), and a switching controller to automatically control switching between these disc devices. In the technique, the switching controller controls switching a master and slave relationship of these disc devices in response to a switching signal, to switch between the two disc devices to select one of the two disc devices to boot an operating system (OS). To control switching the boot devices, a computer counts, using a timer, an elapsed time from generation of a start signal for booting the OS, and then determines whether completion of the OS boot is detected in a predetermined elapsed time.

This technique, however, simply controls the master and slave relationship between the two boot devices, using a controller that is mounted in each boot device. More specifically, each controller recognizes whether the corresponding boot device is master or slave, and thus determines an on state or off state of the corresponding boot device.

SUMMARY

An information processing device, according to one embodiment, includes at least a first storage device and a second storage device to store a boot program individually, a first processor to read the boot program from the first storage device to boot the information processing device from the first storage device, and a second processor connected to each of the first storage device and the second storage device and the first processor. The second processor detects a completion or a failure of the boot from the first storage device, and when detecting the failure of the boot, switches a storage device to be used for booting from the first storage device to the second storage device to control the first processor to read the boot program from the second storage device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing example embodiments illustrated in the drawings, specific terminology is employed for the sake of clarity. However, the present disclosure is not intended to be limited to the specific terminology so selected and it is to be understood that each specific element includes all technical equivalents that operate in a similar manner. Before describing embodiments, a basic configuration of a computer system that boots an operating system according to the related art is described below in more detail.

Figure 11:
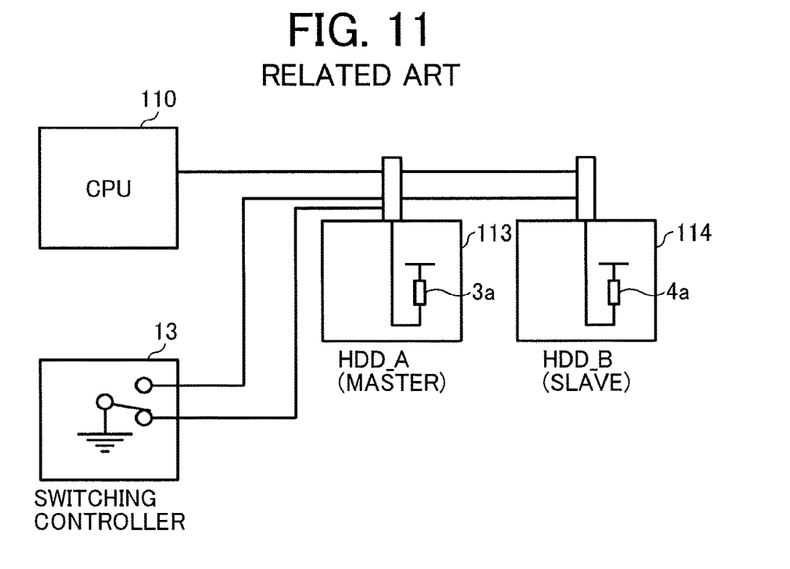
FIG. 11 is a block diagram illustrating a configuration of a computer system that includes a controller in each boot device, according to the related art.

FIG. 11 is a block diagram illustrating a configuration of a computer system that includes a controller in each boot device, for example, as described in JP-2002-259130-A1. The computer system includes a CPU 110, a boot device_A 113, a boot device_B 114, and a switching controller 13. The boot device_A 113 and the boot device_B 114 are each implemented by a hard disc drive (HDD), namely HDD_A and HDD_B. The boot device_A 113 and the boot device_B 114 include a controller 3*a* and a controller 4*a* respectively. The boot device_A 113 and the boot device_B 124 use the controller 3*a* and the controller 4*a*, respectively, to recognize a device's own status as master or slave and individually determine on or off of the device.

Such boot devices individually need to include a controller to determine on or off by itself. Unfortunately, storage devices that individually store a BIOS program do not include a controller for each storage device, so that the storage devices cannot determine on or off by themselves, and cannot be switched. For example, a read only memory (ROM) used as a boot device does not include a controller to determine on or off by itself and the ROMs, accordingly, cannot be switched.

Now, description of exemplary embodiments of the present disclosure is given with reference to the drawings. In the embodiments, the ROM serves as a storage device. Additionally, terms of "boot" and "reboot", here, are used only for a process performed for initialization of a computerized system, such as the computer system, or activation of a boot program, while terms of "starting", "starting up", and "restarting" are used for more broader condition and more flexible way. For example, the terms of "starting", "starting up", and "restarting" may be used for expressing a state when an apparatus including the computer system becomes an on state from an off state, or a process including or excluding a boot process performed by the computer system.

First Embodiment

Figure 1:
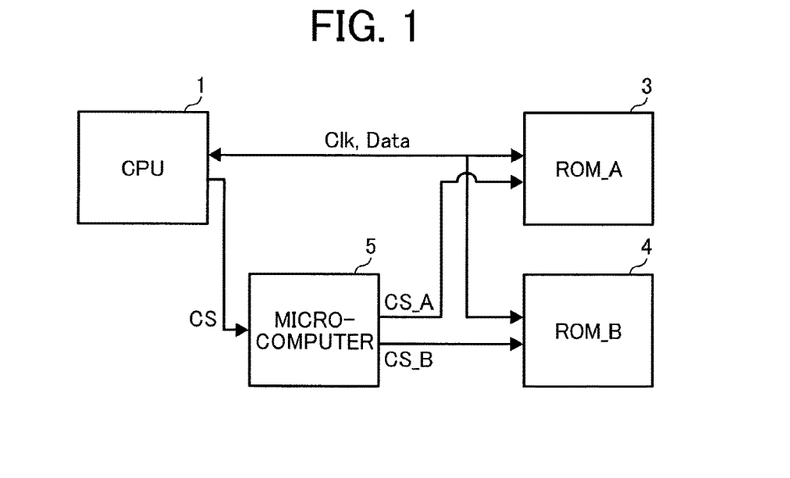
FIG. 1 is a block diagram illustrating a computer system for controlling switching read only memories (ROMs) according to a first embodiment.

FIG. 1 is a block diagram illustrating a configuration of a computer system for controlling switching ROMs according to a first embodiment. The computer system according to the first embodiment includes a CPU (first processor) 1, two boot devices that are a boot device_A (ROM_A) 3 and a boot device_B (ROM_B) 4, and a microcomputer (second processor) 5. In the following description, the boot device and the ROM may be used interchangeably. The ROM_A 3 and the ROM_B 4 individually store a BIOS program (boot program). The CPU 1 is connected, individually, to the ROM_A3 and the ROM_B 4 in parallel. The microcomputer 5, connected to the CPU 1, is further connected, individually, to the ROM_A 3 and the ROM_B 4 in parallel. The CPU 1 outputs a chip select (CS) signal to the microcomputer 5. The microcomputer 5 outputs the CS signal to one of the ROM_A 3 and the ROM_B 4. Here, the CS signal output from the microcomputer 5 to the ROM_A 3 is referred to as a CS_A signal, and the CS signal output from the microcomputer 5 to the ROM_B 4 is referred to as a CS_B signal. When the computer system (information processing device) is turned on, the computer system boots up. In booting the computer system, the microcomputer 5 outputs the CS_A signal to the ROM_A 3 to boot the BIOS from the ROM_A 3. In failing to boot the BIOS, the microcomputer 5 stops outputting the CS_A signal, but starts to output the CS_B signal to the ROM_B 4. The ROM_A 3 and the ROM_B 4 are individually input with a clock (Clk) signal and a data (Data) signal from the CPU 1.

Figure 2:
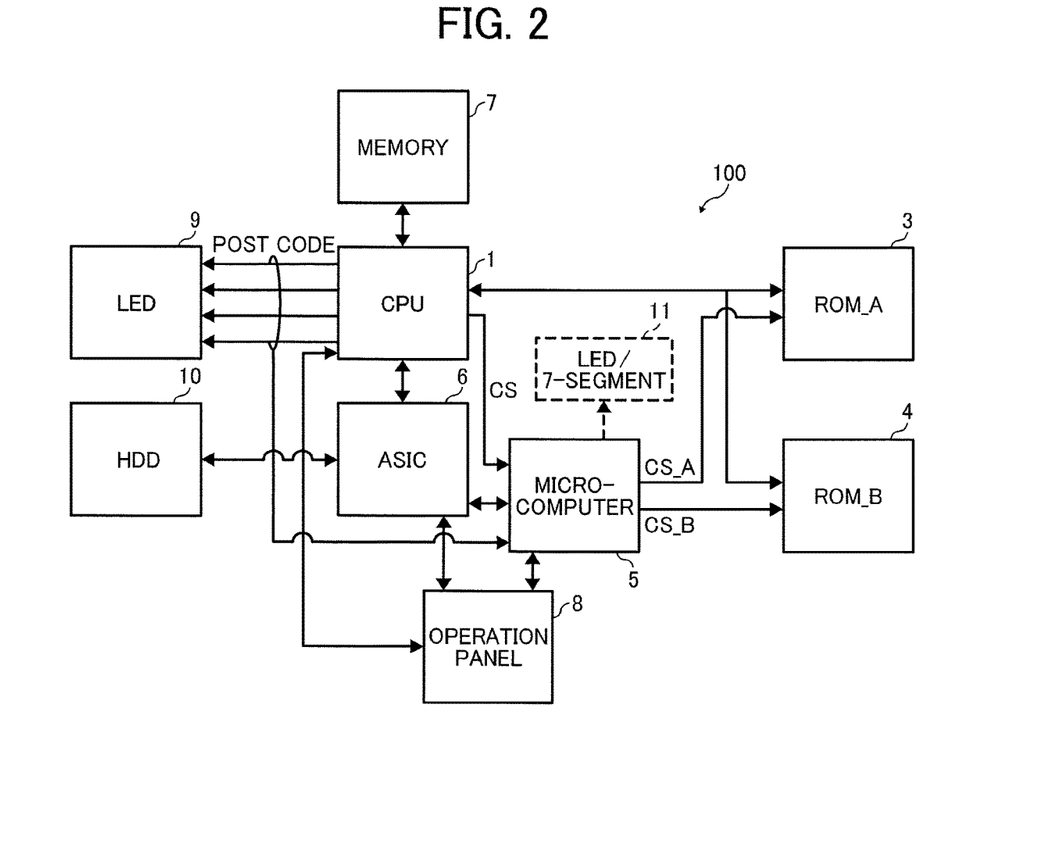
FIG. 2 is a schematic block diagram illustrating a configuration of the computer system according to the first embodiment, which is employed in an image forming apparatus.

FIG. 2 is a schematic block diagram illustrating a configuration of a computer system 100 in an image forming apparatus, when the computer system according to the first embodiment is implemented as the computer system 100.

The computer system 100, which serves as an information processing device, includes the CPU 1, the ROM_A 3, the ROM_B 4, the microcomputer 5, an application specific integrated circuit (ASIC) 6, a memory 7, an operation panel 8, a light emitting diode (LED) 9, and a HDD 10. A configuration including the CPU 1, the ROM_A 3, the ROM_B 4, and the microcomputer 5 in FIG. 2 is the same as the one illustrated in FIG. 1. The computer system 100 may further include a 7-segment LED 11, which is optional.

The ASIC 6 and the CPU 1 are connected with each other to transfer signals therebetween. Similarly, the memory 7 and the CPU 1, the microcomputer 5 and the ASIC 6, and the HDD 10 and the ASIC 6 are connected with each other to transfer the signals therebetween. The operation panel 8 is connected to the CPU 1, the microcomputer 5, and the ASIC 6, to serve as a user interface. The LED 9 is turned on in response to a control signal received from the CPU 1. The microcomputer 5 is connected with the 7-segment LED 11.

The operation panel 8, the LED 9, and the 7-segment LED 11 are display devices that display a notification of a boot error to notify a user of the failure of start up. The computer system 100 usually reports a boot error using the operation panel 8, when failing to boot from the ROM_A 3 or the ROM_B 4. The computer system 100 according to the embodiment also includes the LED 9 and the 7-segment LED 11 with which the error can be reported easier than with only the operation panel 8. In the computer system 100, the microcomputer 5 starts or restarts the system, detects completion or failure of the boot, controls switching the ROMs, and generates an error notification when the computer system 100 fails to boot up. Such sequence of processes may be collectively known as a boot process.

As described above, the BIOS boot process includes a plurality of steps. To indicate which step during or after the BIOS boot process the CPU 1 is currently processing, a basic power-on self-test (POST) code is used. The CPU 1 outputs the POST code, according to the current step in the BIOS boot process. With the configuration of the embodiment, an 8-bit signal (0 or 1) is output. That is, in case of an error in the boot process, the LED 9 uses eight LEDs to display the error notification.

Figure 3:
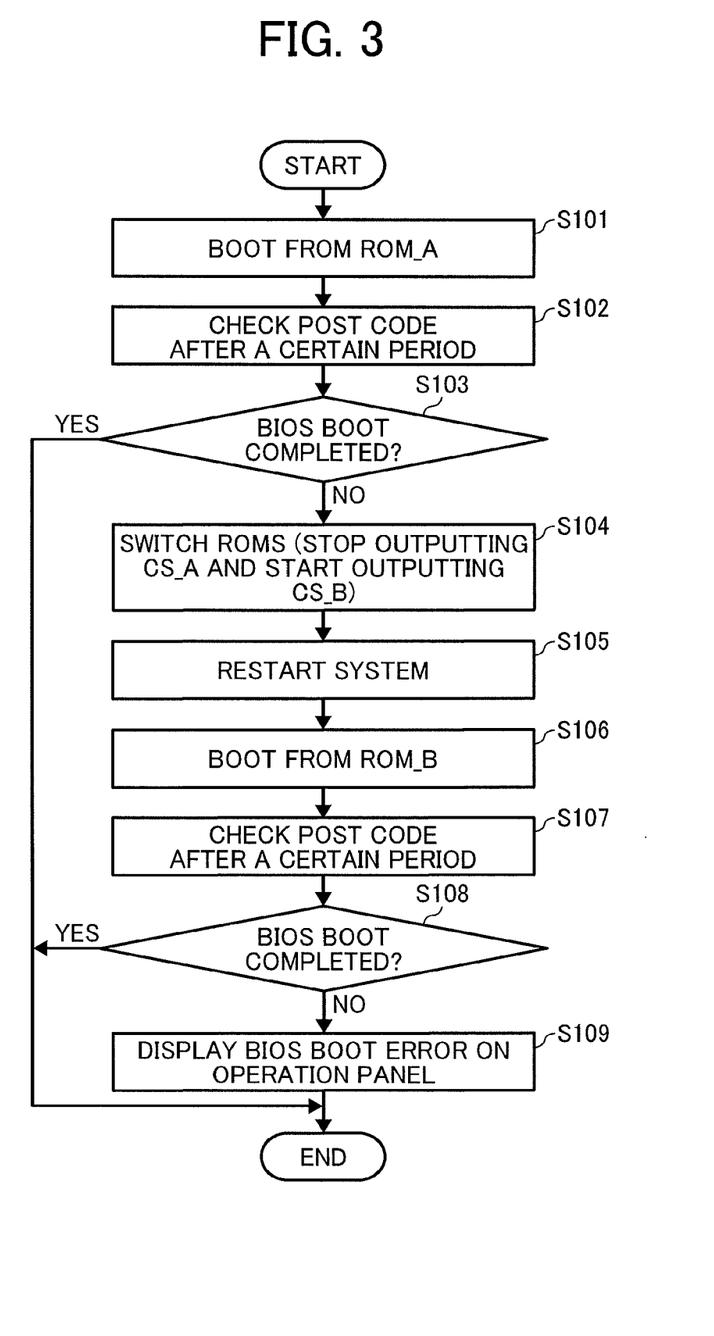
FIG. 3 is a flowchart illustrating a boot process, performed by a computer system of FIG. 2, according to an embodiment.

FIG. 3 is a flowchart illustrating a boot process, performed by the computer system 100 of FIG. 2, according to the first embodiment.

When a user turns on a main power supply switch of the image forming apparatus, systems boot up sequentially. Of the boot process, the BIOS boot as illustrated in FIG. 3 is an initial system boot. In the BIOS boot process, the CPU 1 reads the BIOS program, at first, from the ROM_A 3 to boot the system (S101). The microcomputer 5 checks the POST code output from the CPU 1, after a certain period elapses (S102), and determines whether the BIOS boot is completed (S103). If the output of POST code indicates a state after the BIOS boot, the microcomputer 5 determines the completion of the BIOS boot (S103: Yes).

To check the POST code output and determine the completion of the BIOS boot, a polling method may be used, in which the microcomputer 5 periodically checks the POST code output, for example every 1 ms period, and determines to see if it continuously detects the same output, for example, three times. As another method of determining the completion besides the polling method, there is an interruption method. The interruption method determines the completion of the BIOS boot when the POST code output indicating the state after the BIOS boot is input to the microcomputer 5 that is in a standby state. Any one of the above-mentioned methods can be used.

At S103, when the microcomputer 5 determines the completion of the BIOS boot, the boot process is completed, and the CPU 1 initializes devices such as the memory 7 and the HDD 10 to be ready for use and proceeds to a next process. The next process, here, means any sequence that can be performed after completion of the boot process, and the explanation of the next process is omitted.

In contrast, when S103 determines the failure of the BIOS boot, the microcomputer 5 performs shut down sequence. The microcomputer stops outputting the CS_A signal and starts outputting the CS_B signal (S104). The microcomputer 5 then restarts the entire system (S105). In restarting the system, the CPU 1 reads the BIOS program from the ROM_B 4 to boot the system (S106). That is, the microcomputer 5 controls output of the select signal, which is the CS_B signal in this example, to the selected boot device, which is the ROM_B in this example, to switch the boot device used for booting. The microcomputer 5 then checks the POST code, which is output from the CPU 1, after a certain period elapses (S107), and determines whether the boot is completed (S108), which is the same procedure as the first boot. If the boot is completed (S108: Yes), the boot process is completed. If the boot fails (S108: No), the microcomputer 5 causes the operation panel 8 to display the BIOS boot error (S109), and the boot process is completed. In the above-described embodiment, the certain time period may be previously set, for example, according to the user preference. At S103 and at 108, the microcomputer 5 stores information indicating whether the BIOS boot is completed in its internal memory. The operation panel 8, accordingly, can also display the error based on the information stored in the internal memory of the microcomputer 5.

The process illustrated in the flowchart of FIG. 3 is performed according to a plurality of instructions, which may be downloaded to the microcomputer 5, from any desired memory capable of storing such instructions in the form of software.

Second Embodiment

Figure 4:
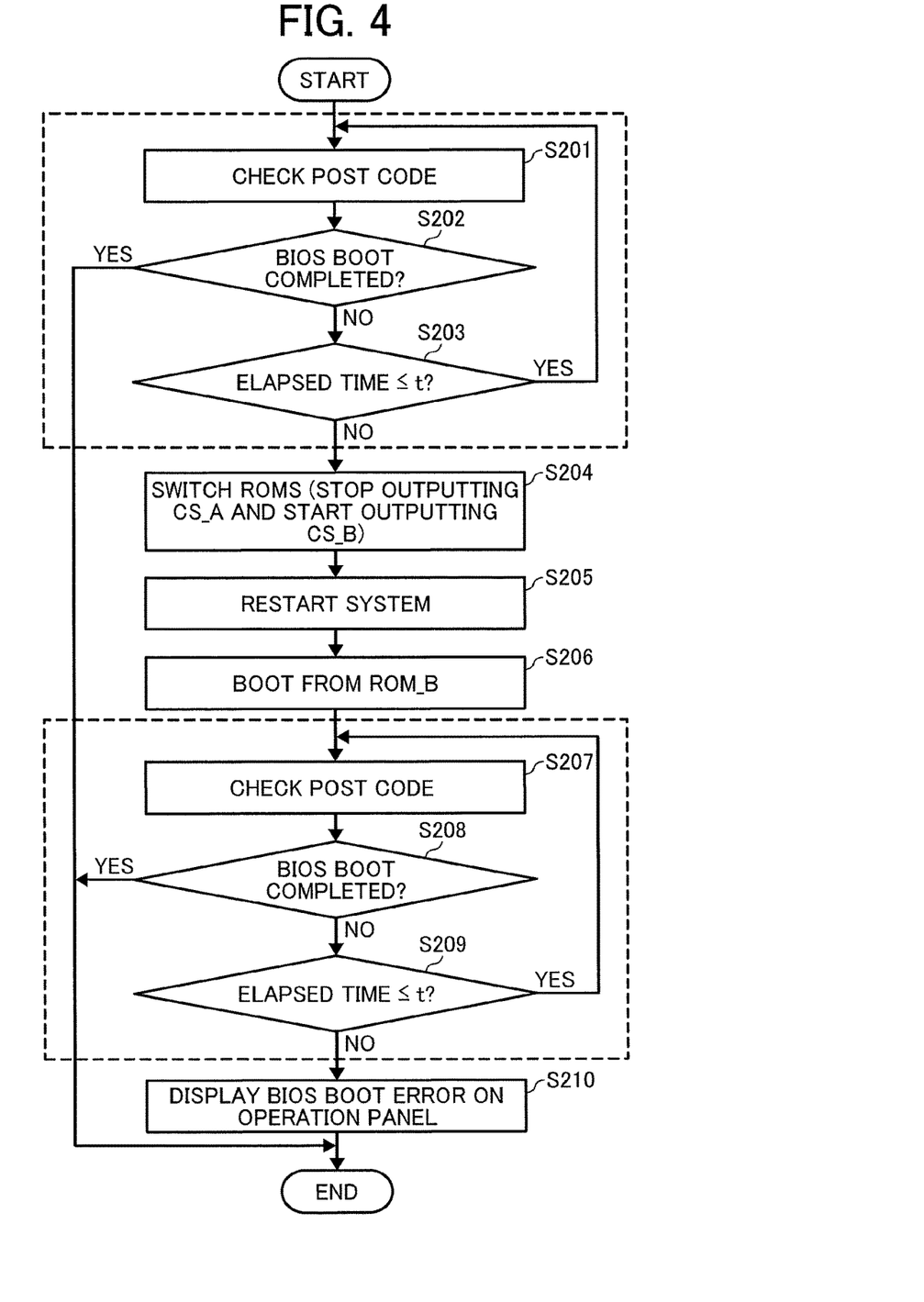
FIG. 4 is a flowchart illustrating another boot process, performed by the computer system of FIG. 2, according to an embodiment.

FIG. 4 is a flowchart illustrating an exemplary boot process, performed by the computer system 100 of FIG. 1, according to a second embodiment. In the boot process of FIG. 4, as indicated by dashed line, an order of performing S102 and S103 and an order of performing S107 and S108 are changed from those orders as described above referring to FIG. 3. More specifically, in FIG. 3, the microcomputer 5 checks the POST code after a certain period elapses (S102), and determines whether the BIOS boot is completed (S103). In contrast, in the exemplary boot process of FIG. 4, the microcomputer 5 checks the POST code right after the process starts, without waiting for a certain period to elapse. The steps S201 to S203 are repeated until the elapsed time becomes greater than a predetermined time "t", unless the microcomputer detects the completion of the BIOS boot.

In FIG. 4, at first, the CPU 1 (first processor) reads the BIOS program from ROM_A 3 to boot, and the microcomputer (second processor) 5 checks the POST code (S201). The microcomputer 5 determines whether the boot is completed (S202). If the boot is completed (S202: Yes), the process is completed. If the boot is not completed (S202: No), the microcomputer 5 counts an elapsed time from a time that the microcomputer 5 starts checking the POST code, and determines whether the elapsed time is greater than the predetermined time "t" (S203).

The process from S201 to S203 repeats until the elapsed time exceeds the predetermined time "t" (the predetermined time corresponds to a certain period of time at S102) (S203: Yes: returns to S201 to repeat the process from S201 to S203). When the elapsed time exceeds the predetermined time t, the microcomputer 5 stops outputting the CS_A signal and starts outputting the CS_B signal (S204). At that time, the microcomputer 5 restarts the entire system. In restarting the system, the CPU 1 reads the BIOS program from ROM_B 4 to boot (S206). In short, the microcomputer 5 controls output of the selected signal, that is, the CS_B signal in this example, to the selected boot device, namely the ROM_B in this example, to switch the boot device for booting.

Subsequently, the microcomputer 5 checks the POST code (S207), and determines whether the BIOS boot is completed (S208). If the boot is completed, the process is completed. If the boot is not completed, the microcomputer 5 determines whether the elapsed time exceeds the predetermined time t (S209). If the BIOS boot is still not completed when the elapsed time exceeds the predetermined time t, (S208: No), the microcomputer 5 notifies the user of the BIOS boot error by causing the operation panel 8 to display the BIOS boot error (S210) and the process ends.

As described above, the boot device (ROM) can still be switched with the boot process of FIG. 4 that is different from the boot process of FIG. 3.

The process illustrated in the flowchart of FIG. 4 is performed according to a plurality of instructions, which may be downloaded to the microcomputer 5, from any desired memory capable of storing such instructions in the form of software.

Third Embodiment

Figure 5:
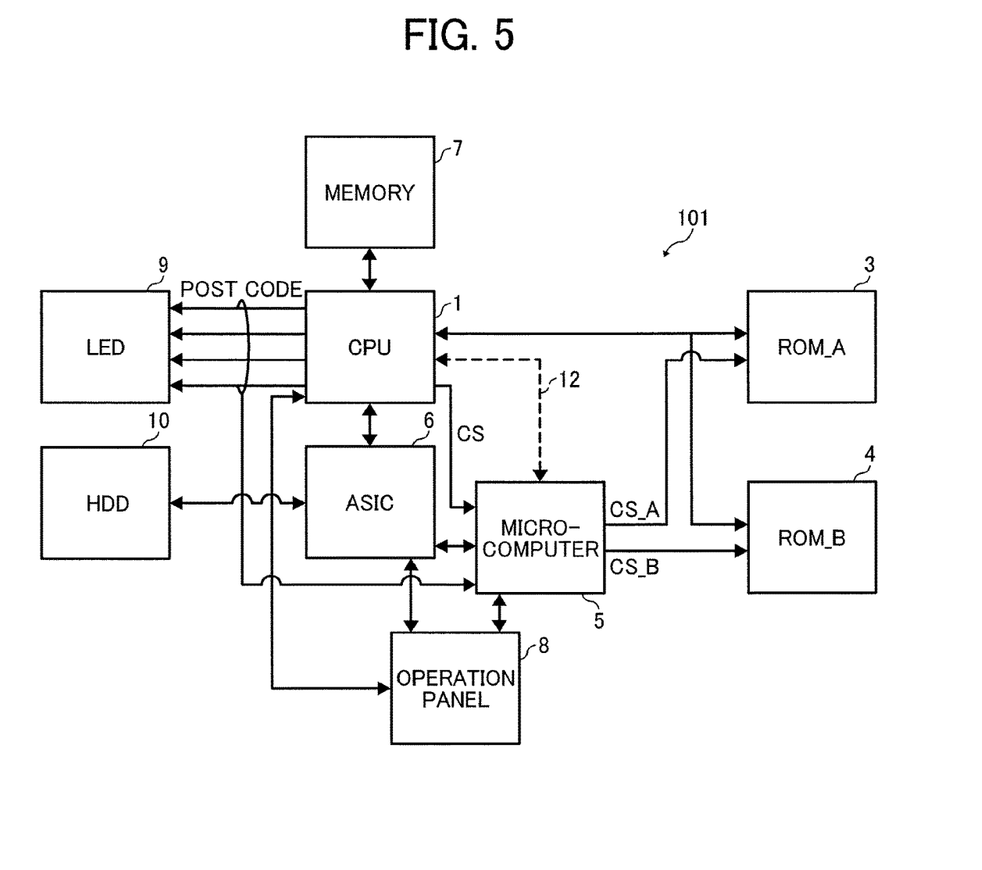
FIG. 5 is a schematic block diagram illustrating a configuration of a computer system according to a third embodiment.

FIG. 5 is a schematic block diagram illustrating a configuration of a computer system 101 having a BIOS program recovery function, according to a third embodiment, which is employed in an image forming apparatus. The computer system 101 according to the third embodiment is different from the computer system 100 according to the first or second embodiment in that the CPU (first processor) 1 and the microcomputer (second processor) 5 are connected via a communication path 12, which is indicated by a dashed line in FIG. 5, to enable recovery of the BIOS program based on communication via the communication path 12. In FIG. 5, for simplicity, the 7-segment LED 11 illustrated in FIG. 2 is omitted. Since the elements other than the communication path 12 are the same as the elements illustrated in FIG. 2, explanation of those elements is omitted.

Figure 6:
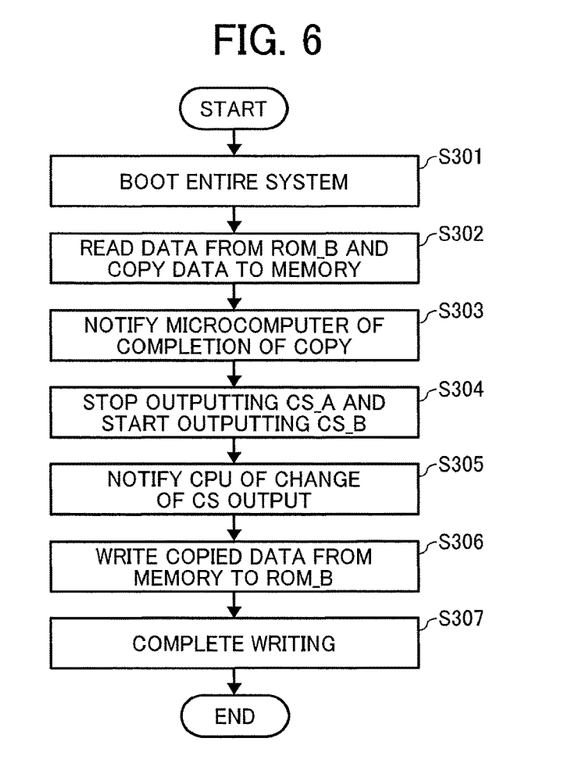
FIG. 6 is a flowchart illustrating a recovery process performed by the computer system according to the third embodiment.

FIG. 6 is a flowchart illustrating a recovery process performed by the computer system 101 according to the third embodiment. The recovery process illustrated in FIG. 6 recovers BIOS program data in a case where the boot is failed due to a bug in the BIOS program. When the ROM itself is physically broken and failed to boot, the data is hardly recovered so that such a case is exclusion from the scope of the third embodiment.

The process of the flowchart illustrated in FIG. 6 starts with a condition after the computer system 101 fails to boot up from the ROM_A 3 and then successfully boots from the ROM_B 4. The CPU 1 boots the entire system (S301). When the boot process of the system is completed, the CPU 1 reads the data stored in the ROM_B 4 and copies the read data to the memory 7 (S302). After the copy is completed, the CPU 1 notifies the microcomputer 5 of the completion of the copy through the communication path 12 (S303).

The microcomputer 5, which receives the notification of the completion of the copy through the communication path 12, stops outputting the CS_B signal and starts outputting the CS_A signal (S304). The microcomputer 5 then notifies the CPU 1 of the change of the CS output (S305) through the communication path 12. Subsequently, the CPU 1 writes the data, which is copied from the ROM_B 4 to the memory 7, to the ROM_A 3 (S306). When the write is completed (S307), the recovery process is completed.

As described above, even when the data stored in the ROM_A 3 is corrupted, the computer system 101 can recover the corrupted data stored in the ROM_A 3 by reading and copying the data from the ROM_B 4 to the memory 7 and then writing the copied data to the ROM_A 3. The computer system 101, accordingly can boot the BIOS program from the ROM_A 3 in the next boot process.

The process illustrated in the flowchart of FIG. 6 is performed according to a plurality of instructions, which may be downloaded to the CPU 1 and the microcomputer 5, from any desired memory capable of storing such instructions in the form of software.

Fourth Embodiment

In the computer systems 100 and 101 according to the first to third embodiments, the microcomputer 5 switches the boot devices (ROM_A 3 and ROM_B 4) each storing the boot program and causes CPU 1 to boot from one of the boot devices (ROM_A 3 and ROM_B 4) so that reliability can be improved. Switching the boot devices (ROM_A 3 and ROM_B 4) is performed by controlling output of the CS signals that control the operations of the ROM_A 3 and the ROM_B 4. The microcomputer 5 receives the CS signal from the CPU 1, and outputs the CS signal to the ROM_A 3 and the ROM_B 4. Through this, the ROM_A 3 and the ROM_B 4 are set to be on or off and the ROM_A 3 and the ROM_B 4 can be switched.

In any one of the first to third embodiments, the microcomputer (switching controller) 5 controls only the output of the CS signal among various types of signals to the boot devices, which are the ROM_A 3 and ROM_B 4. Transmitting the CS signal via the microcomputer (switching controller) 5 prevents stub (a branched portion of a signal transmission line). However, other signals than the CS signal, such as a clock (Clk) signal and a Data signal, simply use a branched transmission line to be input to the ROM_A 3 and the ROM_B 4 as described in FIG. 1. The stub of the transmission line causes degradation of communication quality between the CPU 1 and the boot devices (ROM_A 3 and ROM_B 4).

Figure 7:
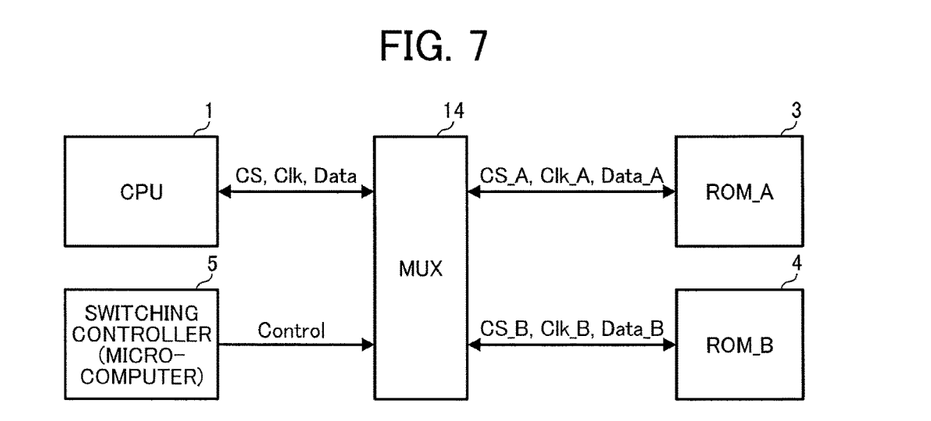
FIG. 7 is a block diagram illustrating a computer system for controlling switching ROMs according to a fourth embodiment.
Figure 8:
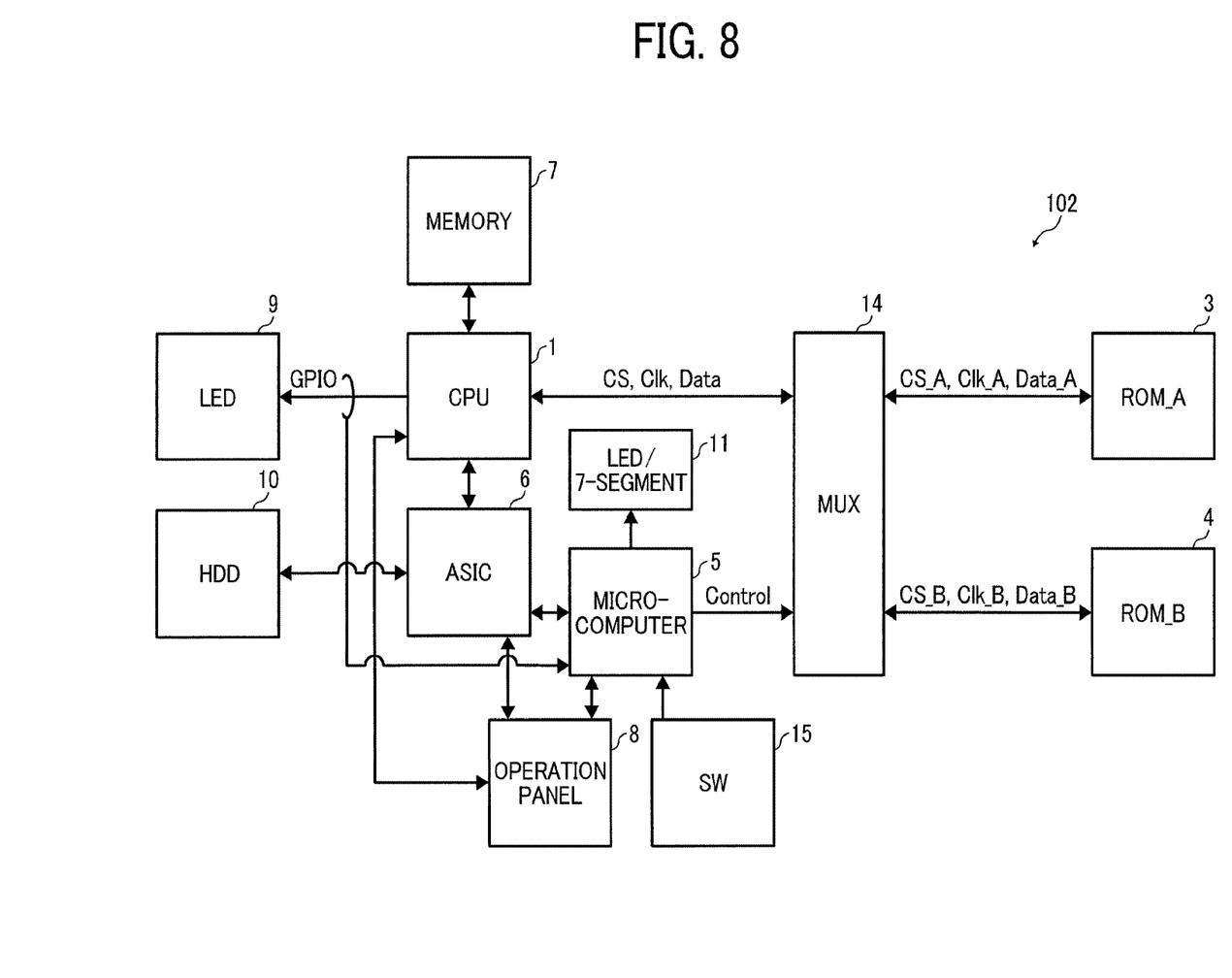
FIG. 8 is a schematic block diagram illustrating a configuration of the computer system according to the fourth embodiment, which is employed in an image forming apparatus.

Referring to FIG. 8, a computer system 102 according to a forth embodiment includes a multiplexer (MUX) 14 to prevent the deterioration of the communication quality between the CPU 1 and the ROM_A 3 and the ROM_B 4 when the ROM_A 3 and the ROM_B 4 are switched. That is, the CS signal, the Clk signal, and the Data signal are input to the MUX 14 before input to the boot devices to prevent the deterioration of the communication quality, as described in FIG. 7. The MUX may be implemented by a logic circuit.

FIG. 7 is a block diagram illustrating a switch control configuration of controlling switching between the two ROMs according to the fourth embodiment. The CPU 1 outputs the CS signal, the Clk signal, and the Data signal that are input to the MUX 14. The MUX 14 outputs each of the CS signal, the Clk signal, and the Data signal to each of the ROM_A 3 and the ROM_B 4 as one input (as one signal). More specifically, after the microcomputer (second processor) 5 detects the failure of the boot, and restarts the system in a boot process of the operating system (BIOS), the microcomputer 5 controls the MUX 14 to stop outputting the CS signal, the Clk signal, and the Data signal to one of the boot devices, which is usually used, namely which fails to boot, before the CPU (first processor) 1 reboots the operating system (BIOS). Subsequently, the microcomputer 5 controls the MUX 14 to output the CS signal, the Clk signal, and the Data signal to the other boot device, which is used for reboot, or recovery.

In FIG. 7, the ROM-switch control configuration according to the embodiment includes the CPU 1, the ROMs that are the ROM_A 3, the ROM_B 4, the microcomputer 5 and the MUX 14. As illustrated in FIG. 7, the CPU 1 has an output of the CS signal, the Clk signal, and Data signal connected to an input of the MUX 14. The MUX 14 is connected to each of the ROM_A 3 and the ROM_B 4. The MUX 14 outputs CS_A signal, the Clk_A signal, and the Data_A signal to the ROM_A 3 as one input (as one signal), and the CS_B signal, the Clk_B signal, and the Data_B signal to the ROM_B 4 as one input (as one signal). The microcomputer (switching controller) 5 is connected to the MUX 14 and outputs a control signal and controls the MUX 14 with the control signal. According to the embodiment, the microcomputer (switching controller) 5 controls the MUX 14 to select to which of the ROM_A 3 and the ROM_B 4 the MUX 14 outputs the signal, which is generated based on the CS signal, the Clk signal, and the Data signal. That is, the MUX 14 outputs the signal, which is generated based on the CS signal, the Clk signal, and the Data signal, to one of the ROM_A 3 and the ROM_B 4 in accordance with the control of the microcomputer (switching controller) 5, namely based on the control signal received from the microcomputer 5.

With the control configuration illustrated in FIG. 7, the MUX 14 outputs the CS_A signal, the Clk_A signal, and the Data_A signal to the ROM_A 3 when the system starts up and the CPU boots the first time. The microcomputer 5, in the embodiment, also has a function to detect failure of the BIOS boot. When detecting the failure of the BIOS boot, the microcomputer 5 controls the MUX 14 to stop outputting the CS_A signal, the Clk_A signal, and the Data_A signal to the ROM_A 3. At the same time, the microcomputer 5 controls the MUX 14 to output the CS_B signal, the Clk_B signal, and the Data_B signal to the ROM_B 4. In short, by controlling the output of the select signals from MUX 14 to the boot devices (ROM_A 3 and ROM_B 4), the boot devices can be switched.

FIG. 8 is a schematic block diagram illustrating the configuration of the computer system 102 according to the fourth embodiment, which is employed in an image forming apparatus.

The computer system 102, which is the information processing device, includes the CPU 1, the ROM_A 3, the ROM_B 4, the microcomputer 5, the ASIC 6, the memory 7, the operation panel 8, the light emitting diode (LED) 9, the hard disc drive (HDD) 10, the MUX 14, and a switch (SW) 15. A configuration including the CPU 1, the ROM_A 3, the ROM_B 4, the microcomputer 5, and the MUX 14 of FIG. 8 is the same as the configuration illustrated in FIG. 7. The computer system 102 includes the boot devices that are the ROM_A 3 and the ROM_B 4 and the system starts up by booting from the ROM_A 3 at the first time.

The ASIC 6 and the CPU 1 are connected with each other to transfer a signal therebetween. Similarly, the memory 7 and the CPU 1, the microcomputer 5 and the ASIC 6, and the HDD 10 and the ASIC 6 are also individually connected with each other to transfer a signal therebetween. The operation panel 8 is connected to the CPU 1, the microcomputer 5, and the ASIC 6, to serve as a user interface. The LED 9 is turned on in response to a control signal received from the CPU 1. The microcomputer 5 is connected with the 7-segment LED 11. The configuration described above is the same as the configuration of the computer system 100 according to the first embodiment.

The operation panel 8 includes a CPU inside. When an error including the BIOS boot error occurs in the computer system 102, communication between the CPU 1 and the CPU of the operation panel 8 cannot be established. In such case, the operation panel 8 notifies the microcomputer 5 of the error. When such boot error occurs at the time of starting the system, and a communication failure occurs between the operation panel 8 and the CPU 1, the time when the operation panel 8 notifies the microcomputer 5 of the error will be a time when the boot failure is detected by the microcomputer 5.

The microcomputer 5 starts or restarts the computer system 102, detects completion or failure of the boot or reboot of the computer system 102, controls switching the boot devices including the ROM_A 3 and the ROM_B 4, and generates the error notification when the computer system 102 fails to start up (boot). The microcomputer 5 can turn off each function of starting or restarting the computer system 102, detecting the completion or the failure of the boot or reboot of the computer system 102, controlling switching the boot devices including the ROM_A 3 and the ROM_B 4, and generating the error notification when the computer system 102 fails to start up. The microcomputer 5 uses the switch 15 that is provided at outside of the microcomputer 5 to turn off the functions described above. That is, with switch control, the functions can be turned on and off. The switch 15 may be used when a single ROM is implemented for the purpose of cost down.

The microcomputer 5 determines the completion or the failure of the boot of the computer system 102 by checking a state of the BIOS boot. The microcomputer 5 determines whether the state of the BIOS boot is a completion state by checking a general purpose input/output (GPIO) port of the CPU 1. For example, the microcomputer 5 determines the state of the BIOS boot is the completion state according to whether communication between the GPIO port and the microcomputer 5 is established. In the embodiment, 1-bit of signal (0 or 1) is used. Alternatively, the POST code used in the first embodiment (as illustrated in FIG. 2) can be used instead of the GPIO port of the CPU 1. The BIOS boot process has a plurality of steps, and the POST code indicates which step during or after the BIOS boot process the CPU 1 is processing. The microcomputer 5 also includes a storage such as a non-voltage memory.

The operation panel 8, the LED 9, and the 7-segment LED 11 are display devices that display a notification of a boot error to notify a user of the failure of start up. The computer system 102 usually reports a boot error using the operation panel 8, when failing to boot from the ROMs including the ROM_A 3 and the ROM_B 4. The computer system 102 according to the embodiment also includes the LED 9 and the 7-segment LED 11 with which the error can be reported easier than with only the operation panel 8.

Figure 9:
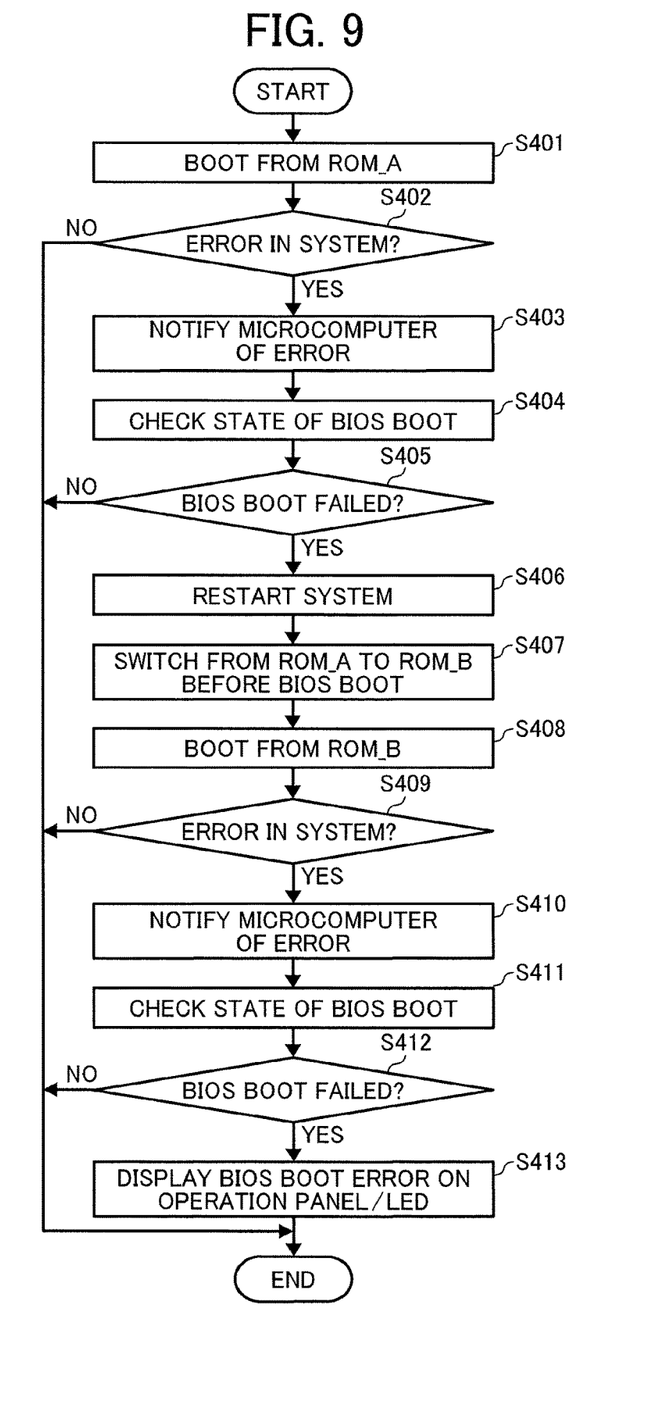
FIG. 9 is a flowchart illustrating a boot process performed by the computer system of FIG. 8.

FIG. 9 is a flowchart illustrating a boot process, performed by the computer system of FIG. 8, according to the fourth embodiment.

When a user turns on a main power supply switch (SW) of the image forming apparatus, systems, including the computer system 102, boot up sequentially. Of the boot process, the BIOS boot described referring to FIG. 9 is an initial system boot in starting the image forming apparatus. The CPU 1 reads a BIOS program from the ROM_A 3 via the MUX 14 to boot at the first time (S401). Next, whether any error including the BIOS boot error occurs in the computer system 102 is checked (S402). If the error occurs (S402: Yes), the operation panel 8 notifies the microcomputer 5 of the error (S402). At that time, the microcomputer 5 checks a state of the BIOS boot (S404). If the operation panel 8 notifies the microcomputer 5 of nothing, which means the BIOS boot error does not occur.

If the check at S404 determines the BIOS boot failure (S405: No), the microcomputer 5 restarts the computer system 102 (S406). In restarting the computer system 102, the microcomputer 5 also once turns off. At the time of turning off the microcomputer 5, or before turning off the microcomputer 5, the microcomputer 5 stores information on the boot error of the ROM_A 3 in the non-volatile memory of the microcomputer 5. Thus, the microcomputer 5 can switch the ROMs, namely the boot devices, appropriately when the computer system 102 starts up next time. Through this, the microcomputer 5 can switch the ROMs from the ROM_A 3 to the ROM_B 4 by controlling the MUX 14 based on the information stored in the non-volatile memory inside before the CPU 1 reboots the BIOS from the ROM_A 3 via the MUX 14, so that the CPU 1 reboots from the ROM_B 4 via the MUX 14. That is, by using the non-volatile memory and referring the information stored in the non-volatile memory at the beginning of the restart, the microcomputer 5 can switch the ROMs appropriately even when the microcomputer 5 once turns off.

With this configuration, the CPU 1 reads the BIOS program from the ROM_B 4 via the MUX 14 to boot (S408). Subsequently, whether any error including the BIOS boot error occurs in the computer system 102 is checked (S409). If the error occurs (S409: Yes), the operation panel 8 notifies the microcomputer 5 of the error (S410). At that time, the microcomputer 5 checks a state of the BIOS boot (S411). If the-above mentioned check by the microcomputer 5 determines the BIOS boot failure again (S412: Yes), this means that booting from both of the ROM_A 3 and the ROM_B 4 fails. In this case, the microcomputer 5 causes the operation panel 8 and/or the 7-segment LED 11 to display the BIOS boot error. If the check at S402 or S409 determines that no error occurs, or the BIOS boot is completed at S405 or S412, the computer system 102 successfully boots up, or is activated so that the process is completed.

Although the exemplary embodiments of the disclosure have been described and illustrated above, such description is not intended that the disclosure be limited to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

For example, while only two storage devices are illustrated, more than two storage devices (ROMs) may be provided, which may be switched. In such case, an order of switching may be previously set and stored in an internal memory of the computer system.

According to one or more embodiments, the information processing device (computer system 100, 101, and 102) includes the plurality of storage devices (ROM_A 3 and ROM_B 4) each of which stores a boot program, the first processor (CPU 1) to read the boot program from one of the plurality of storage devices (ROM_A 3 and ROM_B 4) and the second processor (microcomputer 5) to detect completion or failure of the boot from the one of the plurality of storage devices (ROM_A3 and ROM_B 4), to restart the entire system and switch between the storage devices (ROM_A 3 and ROM_B 4) after the detection of the boot failure.

According to one or more embodiments, the method for booting the information processing device (computer system 100, 101, and 102) includes reading the boot program from one of the plurality of storage devices (ROM_A 3 and ROM_B 4) and booting or rebooting the information processing device (computer system 100, 101, and 102), detecting completion or failure of the boot (S103, S108, S405, and S412), and when the failure of the boot is detected, restarting the entire system (S105, and S406), and switching between the storage devices (ROM_A 3 and ROM_B 4) (S104 and S407). Consequently, the second processor (microcomputer 5) can switch the storage devices (ROM_A 3 and ROM_B 4) storing the boot program after the detection of the boot failure, and the first processor (CPU 1) reboots the information processing device (computer system 100, 101, and 102). That is, the information processing device (computer system 100, 101, and 102) can reboot in case of failing to boot from one of the storage devices (ROM_A 3) by switching the one of the storage device (ROM_A 3) to another storage device (ROM_B 4), even when the storage device (ROM), serving as a boot device, has no controller.

According to one or more embodiments, the information processing device (computer system 101) switches the storage devices (ROM_A 3 and ROM_B 4) based on the select signals (chip select signals CS_A and CS_B) that are output from the second processor (microcomputer 5) to the storage devices (ROM_A 3 and ROM_B 4). Consequently, the information processing device (computer system 101) can reboot, even when failing to boot from one of the storage devices (ROMs), by switching the one of the storage devices (for example, ROM_A 3) to another one of the storage devices (for example, ROM_B 4). The switching instruction is, for example, based on the chip select signal CS output from the first processor (CPU 1).

According to one or more embodiments, the information processing device (computer system 102) further includes the logic circuit (MUX 14) to output signals as one input to each of the plurality of the storage devices (ROM_A 3 and ROM_B 4), and the second processor (microcomputer 5) controls the logic circuit (MUX 14) by outputting the select signal (control signal) in order to control switching the storage devices (ROM_A 3 and ROM_B 4). Consequently, degradation of communication quality due to a stub can be prevented.

According to one or more embodiments, in the information processing device (computer system 100, 101, and 102), the first processor (CPU 1) controls each element of the information processing device (computer system 100, 101, and 102), in which the second processor (microcomputer 5) detects the completion of the boot or the failure of the boot based on the output (POST code and 1-bit of signal) of the first processor (CPU 1) (S102, S103, S107, S108, S405, and S412). Consequently, the second processor (microcomputer 5) can determine whether the boot is completed, and thus select a next process appropriately.

According to one or more embodiments, in the information processing device (computer system 100 and 101), the first processor (CPU 1) controls each element of the information processing device (computer system 100 and 101), in which the first processor (CPU 1) reads the boot program from the second storage device that has completed the boot (for example, ROM_B 4) and writes the read program to the first storage device that has failed to boot (for example, ROM_A 3), when the second processor (microcomputer 5) detects the failure of the boot from the first storage device (ROM_A 3) (S302-S306). Consequently, the first storage device (ROM_A 3) can be automatically recovered and used for the next boot.

According to one or more embodiments, in the information processing device (computer system 102), the second processor (microcomputer 5) includes a storage (non-volatile memory in the microcomputer 5) to store information on a boot error and the storage device associated with the boot error (for example, ROM_A 3) when the second processor (microcomputer 5) detects the boot error associated with the storage device (for example, ROM_A 3). Consequently, the second processor (microcomputer 5) can cause the first processor (CPU 1) to reboot based on the information stored in the storage (non-volatile memory in the microcomputer 5) in restarting the entire system.

According to one or more embodiments, in the information processing device (computer system 102), the first processor (CPU 1) controls each element of the information processing device (computer system 102), in which the second processor (microcomputer 5), after detecting the failure of the boot from one of the plurality of storage devices (ROM_A 3) and when restarting the entire system (S406), controls the logic circuit (MUX 14) to select another storage device of the plurality of storage device (ROM_B 4) (S407) based on the information stored in the storage (non-volatile memory in the microcomputer 5). Consequently, the second processor (microcomputer 5) can switch the storage devices (ROM_A 3 and ROM_B 4) appropriately by reflecting the information stored in the storage (non-volatile memory in the microcomputer 5), even when the second processor (microcomputer 5) itself once turns off in restarting the system.

According to one or more embodiments, in the information processing device (computer system 100, 101, and 101) includes display devices (microcomputer 5, operation panel 8, and 7-segment LED 11) to notify a user or outside of the boot failure when the boot from all of the storage devices (ROM_A 3 and ROM_B 4) fails. Additionally, According to one or more embodiments, the method for booting the information processing device (computer system 100, 101, and 102) includes notifying a user or outside of the boot failure (S109, S201, and S413) when the boot from all of the plurality of storage devices (ROM_A 3 and ROM_B 4) fails. Consequently, the user can recognize that the information processing device (computer system 100, 101, and 102) fails to start up at that time. Additionally, the user can intuitively recognize the boot failure of the information processing device (computer system 100, 101, and 102) by viewing a display presenting an error notification with the operation panel 8, the LED 9, or the 7-segment LED 11.

According to one or more embodiments, a method for booting the information processing device (computer system 100), which includes the ROM_A 3 and the ROM_B 4 each storing a boot program, includes booting from one of the ROM_A 3 and the ROM_B 4 with the first processor (CPU 1), detecting completion or failure of the boot (S102 and S103), and when the failure of the boot is detected, switching the storage devices (ROM_A 3 and ROM_B 4) (S104) with the second processor (microprocessor 5). Consequently, the second processor (microcomputer 5) can switch the storage devices (ROM_A and ROM_B), each of which stores the boot program, when the boot fails, and thus the second processor (microcomputer 5) can cause the first processor (CPU 1) to reboot the information processing device (computer system 100).

According to one or more embodiments, a non-transitory recording medium storing a plurality of instructions which, when executed by one or more processors, cause the processors to perform the method for booting the information processing device (computer system 100), which includes the ROM_A 3 and the ROM_B 4 each storing a boot program, includes booting from one of the ROM_A 3 and the ROM_B 4 with the first processor (CPU 1), detecting completion or failure of the boot (S102 and S103), and when the failure of the boot is detected, switching the storage devices (ROM_A 3 and ROM_B 4) (S104) with the second processor (microprocessor 5). Consequently, the plurality of instructions to switch storage devices (ROM_A 3 and ROM_B 4) each storing the boot program can be written in the first processor (microcomputer 5) of the information processing device (computer system 100) and the first processor (microcomputer 5) executes the instructions to cause the first processor (CPU 1) and the second processor (microcomputer 5) to perform the method. Through this, the first processor (microcomputer 5) can switch the storage devices (ROM_A 3 and ROM_B 4), each of which stores a boot program when the first processor (CPU 1) fails to boot from one of the plurality of storage devices and thus the first processor (CPU 1) can reboot the information processing device (computer system 100) from another one of the plurality of storage devices.

The plurality of instructions are, for example, written in the first processor (microcomputer 5) from a personal computer (PC). The plurality of instructions may be stored in a storage medium. The plurality of instructions can be installed to the PC via the storage medium and then written to the computer (microcomputer 5). Such a storage medium may be the non-transitory recording medium. The non-transitory recording medium is not limited, but includes, for example, a storage medium such as a CD-ROM.

What is claimed:

1. An information processing device that operates under a computer system, the device comprising:
   at least a first storage device and a second storage device, each configured to store a boot program;
   a first processor configured to read the boot program from the first storage device to boot a system of the information processing device from the first storage device; and
   a second processor connected to each of the first storage device and the second storage device and the first processor, the second processor being configured to detect a completion or a failure of the boot from the first storage device, and
   when detecting the failure of the boot, switch a storage device to be used for booting from the first storage device to the second storage device to control the first processor to read the boot program from the second storage device,
   wherein when the second processor detects the failure of the boot from the first storage device, and the first processor successfully boots from the second storage device, the first processor further reads the boot program from the second storage device, and writes the boot program read from the second storage device to the first storage device to overwrite the boot program previously-written to the first storage device.

2. The information processing device of claim 1, wherein the second processor is further configured to control an output of a select signal to one of the first storage device and the second storage device that is to be used for booting.

3. The information processing device of claim 1, further comprising:
   a logic circuit disposed between the first processor and the first and second storage devices and configured to output a plurality of signals input from the first processor as one signal to each of the first storage device and the second storage device, and
   wherein the second processor outputs a control signal to the logic circuit to cause the logic circuit to output the plurality of signals to the storage device to be used for booting, the plurality of signals including a select signal input from the first processor.

4. The information processing device of claim 3, wherein the second processor includes a storage area, and
   when the second processor detects the failure of the boot from the first storage device, the second processor stores information on the first storage device and the failure of the boot in the storage area.

5. The information processing device of claim 4, wherein, when the second processor restarts the system after the first processor fails to boot, the second processor controls the logic circuit to output the plurality of signals to the second storage device, before the first processor starts to boot the system again from the first storage device.

6. The information processing device of claim 1, wherein the second processor detects the completion or the failure of the boot based on an output of the first processor indicating the completion of the boot.

7. The information processing device of claim 1, further comprising:
   a display device configured to notify a user of the failure of starting the system, when the first processor fails to boot from all of the first and second storage devices.

8. A method for booting an information processing device that operates under a computer system, the method comprising:
   with a first processor, booting from a first storage device storing a boot program, and
   with a second processor, detecting a completion or a failure of the boot from the first storage device, wherein, the detecting detects the failure of the boot from the first storage device, the detecting further including:
switching a storage device to be used for booting from the first storage device to a second storage device to control the first processor to read the boot program from the second storage device, and
when the second processor detects the failure of the boot from the first storage device, and the first processor successfully boots from the second storage device, the first processor further reads the boot program from the second storage device, and writes the boot program read from the second storage device to the first storage device to overwrite the boot program previously-written to the first storage device.

9. A non-transitory recording medium storing a plurality of instructions which, when executed by a first processor and a second processor, cause the processors to perform a method for booting an information processing device comprising:

with a first processor, booting from a first storage device storing a boot program, and
with a second processor, detecting a completion or a failure of the boot from the first storage device,
wherein, the detecting detects the failure of the boot from the first storage device, the detecting further including:
switching a storage device to be used for booting from the first storage device to a second storage device to control the first processor to read the boot program from the second storage device, and
when the second processor detects the failure of the boot from the first storage device, and the first processor successfully boots from the second storage device, the first processor further reads the boot program from the second storage device, and writes the boot program read from the second storage device to the first storage device to overwrite the boot program previously-written to the first storage device.

* * * * *